Sept. 14, 1926.  
P. STADLER  
1,600,145  
FUR BEARING ANIMAL TRAP  
Filed April 21, 1926  
2 Sheets-Sheet 1

Paul Stadler INVENTOR

BY Victor J. Evans ATTORNEY

WITNESS:

Sept. 14, 1926.  
P. STADLER  
FUR BEARING ANIMAL TRAP  
Filed April 21, 1926  
1,600,145  
2 Sheets-Sheet 2
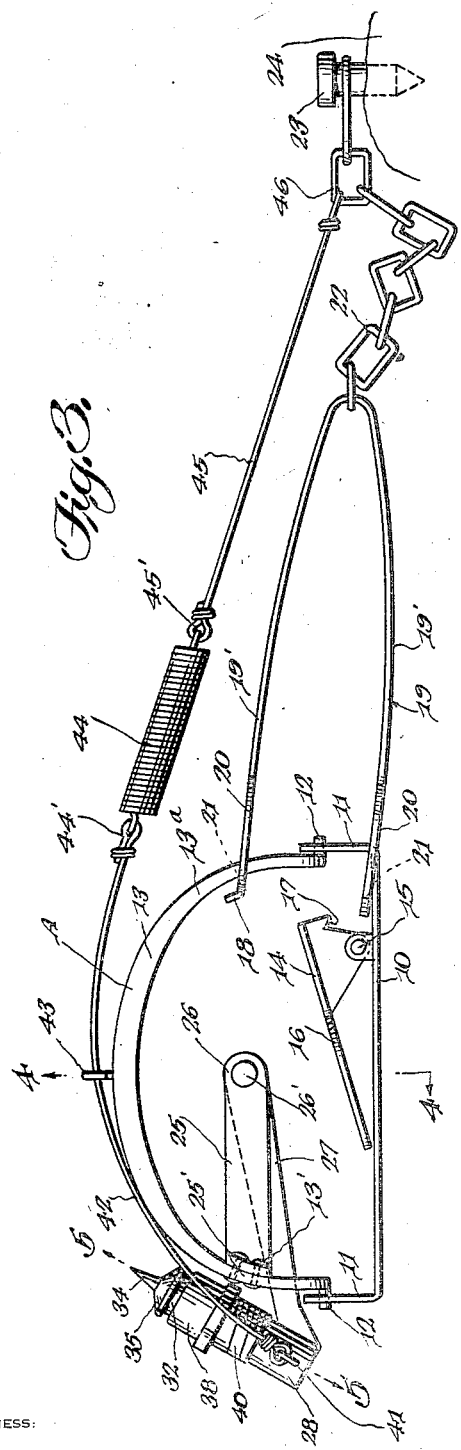
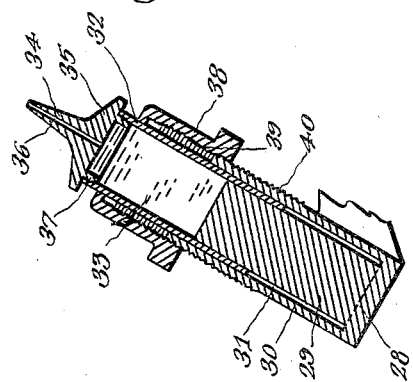
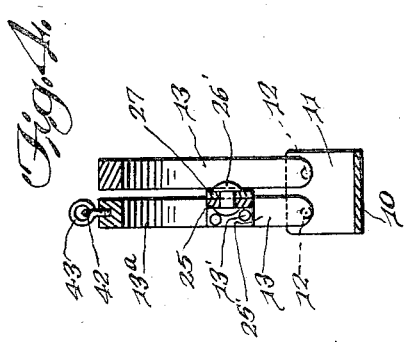
Paul Stadler
INVENTOR
BY Victor J. Evans
ATTORNEY
WITNESS:

Patented Sept. 14, 1926.

1,600,145

UNITED STATES PATENT OFFICE.

PAUL STADLER, OF CHICAGO, ILLINOIS.

FUR-BEARING-ANIMAL TRAP.

Application filed April 21, 1926. Serial No. 103,572.

This invention relates to certain novel and useful improvements in fur-bearing animal traps and more particularly to an attachment for an animal trap whereby the attachment includes certain elements which are adapted to be drawn toward an animal trapped and penetrate the body thereof for rendering the animal unconscious.

A further object of the invention is the provision of a simple combination and arrangement of parts for moving an element into penetrating position in the body of an animal trapped for injecting a fluid in the body of the animal for the purpose of rendering the animal unconscious.

A still further object of the invention is the provision of an improved construction of this character which will be highly efficient in use and economical in manufacture.

The present invention constitutes an improvement over that disclosed in my prior application for United States Letters-Patent filed on or about November 6, 1925, Serial No. 67,360.

Further objects will appear hereinafter.

The invention consists in the novel combination and arrangement of parts to be hereinafter described and claimed.

Figure 1:
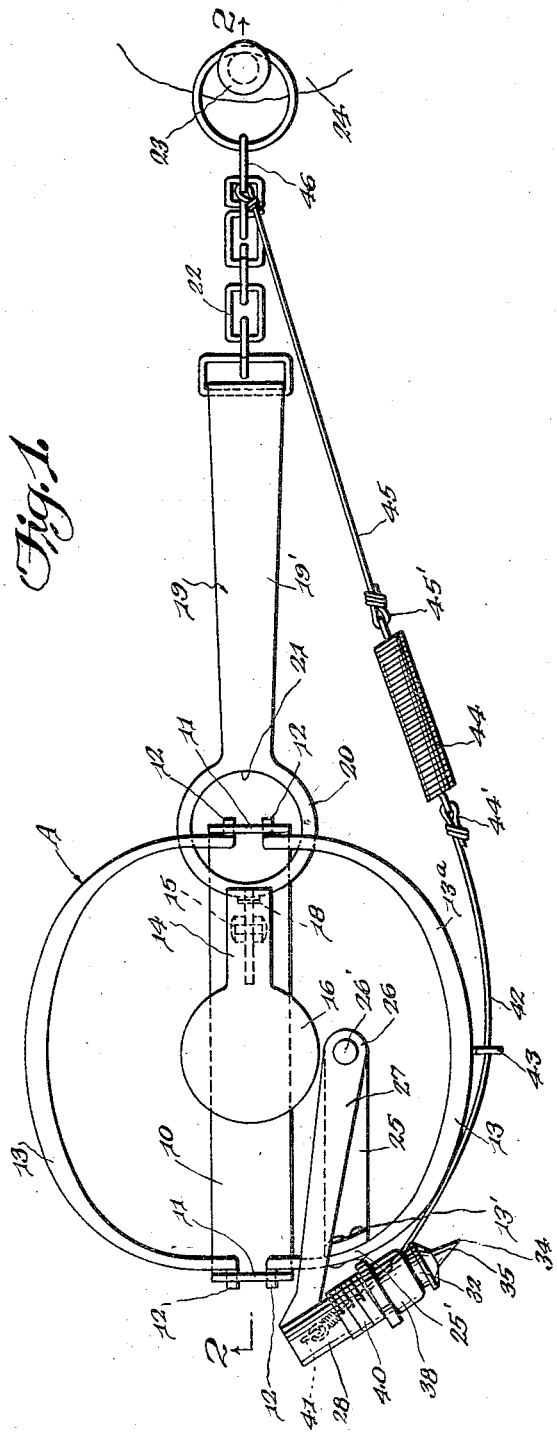
Figure 2:
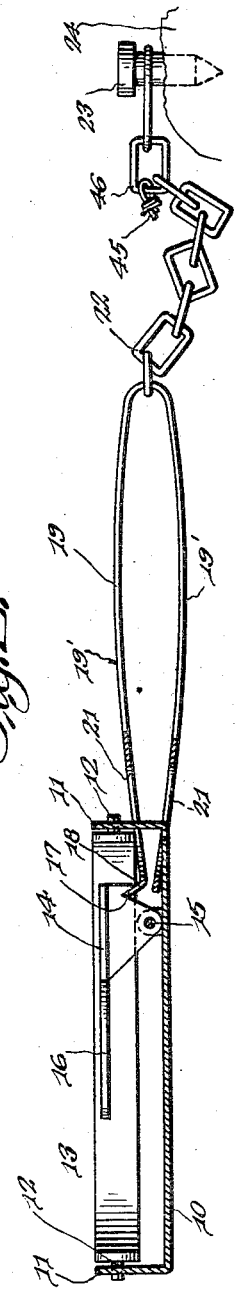

The invention will be best understood by reference to the accompanying drawings illustrating the preferred form of construction, and in which:

Fig. 1 is a top plan view of the invention illustrating the jaws of the trap in open position, Fig. 2 is a sectional detail view of the same taken substantially on line 2—2 of Fig. 1, Fig. 3 is a side elevational view of the invention illustrating the jaws of the trap in closed position, Fig. 4 is a sectional detail view taken substantially on line 4—4 of Fig. 3, and Fig. 5 is a sectional detail view taken substantially on line 5—5 of Fig. 3.

To accomplish the various objects of the invention I provide a trap generally indicated at A which includes a base plate 10 having at opposite ends thereof upturned ears 11 to which the end portions 12 of the trap jaws 13 are pivotally connected, as best illustrated in Fig. 1. This trap A further includes a catch member 14 pivotally connected as at 15, Fig. 4, to the base plate 10. This catch member 14 includes at its forward end portion a circular step plate 16 upon which the animal trapped is adapted to step or engage. This catch 14 includes at its opposite end portion a notch 17 adapted for engagement with an end portion 18 of a U-shaped attaching link 19. The opposite end portions of this attaching link 19 define enlargements 20 having formed therein central openings 21 through which adjacent end portions of the jaws 13 pass.

The operation of the trap thus far described is such that when the animal comes in contact with the step plate 16 of the catch 14 the catch is pivoted about its pivot 15 releasing the end portion 18 of the attaching link 19. Upon release of this end portion the jaws 13 are snapped closed by reason of the resiliency of the attaching link 19. To accomplish this action it is manifest that when the end portion 18 is released from the notch 17 the limbs 19' of the attaching link, by reason of the resiliency of the attaching link 19, will have the tendency to expand, and as only one of these limbs is capable of movement it is manifest that this limb will act upon the jaws 13 and snap them into closed position.

This attaching link 19 is connected to a chain 22 which in turn is connected to a suitable staple 23 preferably driven into the ground 24 as best illustrated in Fig. 2.

The means for injecting the fluid into the body of the animal trapped includes a supporting arm 25 carried by one of the jaws 13 as indicated at 13' as illustrated in Fig. 1. This supporting arm 25 extends inwardly from the end portion 25' of the jaw 13ᵃ to which it is attached and has pivotally connected thereto at its outer end portion 26 as at 26' an arm 27. This arm 27 extends outwardly from the end portion 25' of the jaw herein indicated and has formed thereon as an integral part thereof a sleeve 28. This sleeve 28 includes a central core 29 defining together with the adjacent walls 30 an annular recess 31. This recess 31 is adapted to slidably receive a receptacle 32 adapted to receive a certain amount of liquid 33. Threaded at the outer end of this receptacle is an injecting needle 34. This needle 34 includes a head 35 defining a passage 36 and an annular flange 37 threaded into the receptacle 32 as best illustrated in Fig. 5.

This receptacle is normally held in its outer position, as illustrated in Fig. 5, through the medium of the liquid 33 contained therein. Upon depression of the receptacle 32 the liquid 33 will be ejected through the passage 36 of the needle 34. To limit the inward movement of this receptacle I have provided a collar 38 having internal threads 39 formed thereon for threaded engagement with external threads 40 formed on the sleeve 28. By adjusting this collar longitudinally of the sleeve 28 it is manifest that the inward movement of the receptacle will be governed accordingly.

The sleeve 28 has an eyelet 41 formed thereon to which is connected a flexible cable 42. This cable 42 leads from this eyelet through an eyelet 43 formed on the jaw 13ª carrying the supporting arm 25. The opposite end of the flexible cable 42 is connected to one end of the spring member 44 as at 44', Fig. 3. The other end of this spring member is connected to a cable 45 as at 45'. This cable 45 is connected to a link 46 included as one of the links of the chain 22.

It will be noted in Fig. 3 of the drawings that the connection of the cable 45 to the link 46 is such that there will be a substantially untaut connection between the attaching link 19 and the link 46 for reasons hereinafter set forth.

The operation of the construction thus far set forth is such that when the jaws 13 are snapped into closed position by expansion of the limbs 19' the animal will be effectively trapped. It is manifest that when the animal tries to escape that considerable damage is done to the fur thereof. To overcome this I have made provision for rendering the animal unconscious. This provision includes the injecting needle 34 herein described and the operation of the same is as follows.

When the animal attempts to escape and pulls the trap away from the staple 23 the cable 45 becomes taut and under this condition pivots the arm 25 about its pivotal connection 26' and draws the injecting needle toward and into contact with the adjacent portion of the body of the animal. Further pulling away of the trap will cause the cable 45 to act upon the needle 34 and cause the same to penetrate the body of the animal. As this needle penetrates the body of the animal the receptacle 32 is forced inwardly in the sleeve 28 and a certain amount of the fluid is ejected through the passage 36 into the body of the animal. This fluid is such as will render the animal unconscious thus preventing the animal from attempting to escape, and result in damage to its fur.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and useful and desire to secure by Letters-Patent is:

1. An animal trap, the combination with a fastening element, of pivotally supporting clamping jaws, a supporting member pivotally carried by one of the jaws, a liquid injector carried by the supporting member, a slack connection between the fastening element and the trap, a taut connection between the injector and the fastening element for pivoting the supporting member relative to the said one jaw during the taking up of the slack when the trap is moved away from the fastening element.

2. A trap for fur-bearing animals, the combination with a fastening element, of pivotally mounted jaws, a supporting arm carried by one of the jaws and extending inwardly from one end portion thereof, an arm pivotally carried by the supporting arm, a liquid injector carried by the pivotally carried arm, a slack connection between the trap and the fastening element, and a taut connection between the injector and the fastening element.

3. An animal trap, the combination with a fastening element, of pivotally supporting clamping jaws, a supporting member pivotally carried by one of the jaws, a liquid injector carried by the supporting member, said injector including a sleeve, a receptacle slidably received by the sleeve and an injecting needle carried by the receptacle, a slack connection between the fastening element and the trap, a taut connection between the injector and the fastening element for pivoting the supporting element relative to the said one jaw during the taking up of the slack when the trap is moved away from the fastening element, and means limiting slidable movement of the receptacle.

In testimony whereof I affix my signature.

PAUL STADLER.